(12) United States Patent
Birch et al.

(10) Patent No.: US 10,334,015 B2
(45) Date of Patent: Jun. 25, 2019

(54) APPARATUS AND METHODS FOR SHORTENING USER EXPOSURE TO MALICIOUS WEBSITES

(71) Applicant: Bank of America Corporation, Charlotte, NC (US)

(72) Inventors: Christopher D. Birch, Cincinnati, OH (US); Donald J. Cardinal, San Antonio, TX (US)

(73) Assignee: Bank of America Corporation, Charlotte, NC (US)

( * ) Notice: Subject to any disclaimer, the term of this patent is extended or adjusted under 35 U.S.C. 154(b) by 139 days.

(21) Appl. No.: 15/581,063

(22) Filed: Apr. 28, 2017

(65) Prior Publication Data

US 2018/0316712 A1   Nov. 1, 2018

(51) Int. Cl.
*H04L 29/08* (2006.01)
*G06F 21/56* (2013.01)
*H04L 29/06* (2006.01)

(52) U.S. Cl.
CPC ............. *H04L 67/02* (2013.01); *G06F 21/56* (2013.01); *G06F 21/566* (2013.01); *H04L 63/101* (2013.01); *H04L 63/14* (2013.01); *H04L 63/1483* (2013.01); *G06F 2221/2119* (2013.01)

(58) Field of Classification Search
CPC ... H04L 63/08; H04L 63/101; H04L 63/1441; H04L 63/1433; H04L 63/1416; H04L 63/1408; H04L 29/08072; H04L 29/12066; H04L 45/00; H04L 45/22; H04L 61/1511; G06F 21/6218; G06F 17/3089

USPC ................. 726/2, 23; 709/223, 238
See application file for complete search history.

(56) References Cited

U.S. PATENT DOCUMENTS

| | | | | |
|---|---|---|---|---|
| 7,117,260 | B2 * | 10/2006 | Bimson | G06F 17/211 709/223 |
| 7,231,606 | B2 * | 6/2007 | Miller | H04L 43/50 702/186 |
| 7,540,031 | B2 * | 5/2009 | Kouznetsov | G06F 21/56 380/270 |

(Continued)

OTHER PUBLICATIONS

"IBM® Security Trusteer Rapport™ FAQs," Bank of America Corporation, Retrieved on Mar. 27, 2017.

(Continued)

*Primary Examiner* — Saleh Najjar
*Assistant Examiner* — Michael W Chao
(74) *Attorney, Agent, or Firm* — Weiss & Arons LLP; Michael A. Springs, Esq.

(57) ABSTRACT

A method for enhancing computer security is provided. The method may include receiving a first dataset including a first plurality of web sites and a second dataset including a second plurality of web sites. The second plurality of web sites may comprise whitelisted websites. The method may include executing a first set of instructions, the first set of instructions including accessing each of the first plurality of websites and, based on the accessing, assigning a confidence score to each of the websites. The method may also include executing a second set of instructions. The second set of instructions may include creating a third dataset including a third list of web sites having a URL that includes a predetermined term. The second set of instructions may also include removing from the third dataset the second plurality of websites to create a modified third dataset.

18 Claims, 4 Drawing Sheets

(56) References Cited

U.S. PATENT DOCUMENTS

| | | | |
|---|---|---|---|
| 7,680,890 B1* | 3/2010 | Lin | G06Q 10/107 |
| | | | 706/900 |
| 7,849,502 B1* | 12/2010 | Bloch | H04L 29/12066 |
| | | | 726/11 |
| 7,854,001 B1* | 12/2010 | Chen | H04L 63/1441 |
| | | | 726/11 |
| 8,032,594 B2 | 10/2011 | Helsper et al. | |
| 8,271,588 B1 | 9/2012 | Bruno et al. | |
| 8,521,667 B2* | 8/2013 | Zhu | H04L 63/1408 |
| | | | 706/13 |
| 8,566,938 B1 | 10/2013 | Prakash et al. | |
| 8,683,584 B1* | 3/2014 | Daswani | G06F 21/577 |
| | | | 726/22 |
| 8,689,341 B1* | 4/2014 | Hartmann | H04L 63/1483 |
| | | | 713/188 |
| 8,762,327 B2* | 6/2014 | Van Riel | G06F 17/3089 |
| | | | 707/610 |
| 8,793,799 B2 | 7/2014 | Fritzson et al. | |
| 8,826,444 B1* | 9/2014 | Kalle | H04N 21/25816 |
| | | | 709/223 |
| 8,850,570 B1* | 9/2014 | Ramzan | G06F 1/00 |
| | | | 726/22 |
| 8,990,945 B1* | 3/2015 | Ranadive | H04L 63/1433 |
| | | | 713/187 |
| 9,009,824 B1 | 4/2015 | Chen et al. | |
| 9,027,140 B1* | 5/2015 | Watkins | G06Q 30/0277 |
| | | | 709/219 |
| 9,076,132 B2 | 7/2015 | Golan et al. | |
| 9,143,476 B2 | 9/2015 | Dreller et al. | |
| 9,154,510 B2 | 10/2015 | Schneider et al. | |
| 9,203,785 B2 | 12/2015 | Eikenberry et al. | |
| 9,356,948 B2 | 5/2016 | Higbee et al. | |
| 9,384,208 B2* | 7/2016 | Jellick | H04L 41/082 |
| 9,398,047 B2 | 7/2016 | Goutal | |
| 9,558,352 B1* | 1/2017 | Dennison | G06F 21/552 |
| 10,122,687 B2* | 11/2018 | Thomas | H04L 63/0263 |
| 2005/0050222 A1* | 3/2005 | Packer | G06F 16/9535 |
| | | | 709/238 |
| 2006/0248442 A1* | 11/2006 | Rosenstein | G06F 17/24 |
| | | | 715/205 |
| 2009/0006322 A1* | 1/2009 | Chang | G06F 17/30864 |
| 2009/0064332 A1* | 3/2009 | Porras | H04L 63/101 |
| | | | 726/23 |
| 2009/0198673 A1* | 8/2009 | Gao | G06F 17/30864 |
| 2009/0287705 A1* | 11/2009 | Schneider | G06F 17/30864 |
| 2009/0307320 A1* | 12/2009 | Golan | G06Q 10/107 |
| | | | 709/206 |
| 2010/0017880 A1* | 1/2010 | Masood | G06F 21/51 |
| | | | 726/24 |
| 2010/0186088 A1* | 7/2010 | Banerjee | G06F 21/51 |
| | | | 726/23 |
| 2011/0219448 A1* | 9/2011 | Sreedharan | G06F 21/00 |
| | | | 726/23 |
| 2011/0252478 A1* | 10/2011 | Hubbard | H04L 63/1441 |
| | | | 726/24 |
| 2012/0023593 A1* | 1/2012 | Puder | H04L 63/101 |
| | | | 726/28 |
| 2014/0115699 A1* | 4/2014 | Baddour | H04L 63/1441 |
| | | | 726/22 |
| 2014/0207835 A1* | 7/2014 | Jellick | H04L 41/082 |
| | | | 707/827 |
| 2015/0067853 A1* | 3/2015 | Amrutkar | H04L 63/14 |
| | | | 726/23 |
| 2015/0319138 A1* | 11/2015 | Yan | H04L 63/145 |
| | | | 726/11 |
| 2016/0352777 A1 | 12/2016 | Goutal | |
| 2017/0026389 A1 | 1/2017 | Gatti | |
| 2017/0026399 A1 | 1/2017 | Gatti | |
| 2017/0026409 A1 | 1/2017 | Gatti | |
| 2017/0048273 A1 | 2/2017 | Bach | |
| 2017/0250989 A1* | 8/2017 | Bhattacharya | G06F 21/6218 |

OTHER PUBLICATIONS

"IBM® Security Trusteer Rapport™ What is Trusteer Rapport?" Bank of America Corporation, Retrieved on Mar. 21, 2017.

"Google Safe Browsing," Wikimedia Foundation, Inc., Mar. 19, 2017.

"About PhishLabs—We Fight Back Against the Exploitation of People," PhishLabs, 2015.

* cited by examiner

APPARATUS AND METHODS FOR SHORTENING USER EXPOSURE TO MALICIOUS WEBSITES

FIELD OF TECHNOLOGY

Aspects of the invention relate to enhancing computer security. Specifically, the invention relates to shortening a user's exposure to malicious websites while using the internet.

BACKGROUND

Today, many people use the internet for work, online banking, social networking, shopping, and many other activities. Unfortunately, internet usage is not without its dangers. Malicious software is becoming increasingly prevalent, threatening to compromise a user's safety, personal information, data integrity and computer-based functioning.

Applications are available for identifying malicious websites. Some of these applications request a third-party provider to shut down a malicious website after it has been identified. This is not an optimal approach at least because users remain exposed to the malicious website until it has been shut down, which could take one, two, three or more days. Other applications block a user from accessing a malicious website, but will not shut down the malicious website. This is also not desirable because users who cannot access the applications remain vulnerable to the malicious website.

In would be desirable, therefore, to provide architecture for identifying a malicious website and, after the identification, initiating both a take-down procedure for the malicious website and protecting users from the malicious website in the interim.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION

Aspects of the invention relate to enhancing computer security. The computer security may be the computer security of any suitable computing device.

The invention may include a method. The method may be performed by any suitable computer program such as an application programming interface ("API"). The method may be performed by any suitable set of computer-executable instructions.

The method may include receiving a first dataset. The first dataset may include a first plurality of websites. The first plurality of websites may be websites that have been identified as potentially including malicious software ("malware"). For the purposes of the application, websites that have been identified as potentially including malware may be referred to alternately herein as "suspect websites."

One or more of the first plurality of websites may be identified manually and input into one or more input fields displayed on a user's computing device. One or more of the first plurality of websites may be identified electronically by an application running on the user's computer device, such as a browser plug-in, search engine, or any other suitable application.

In some embodiments, when a suspect website has been identified using any of the methods described above, data identifying the suspect website may be transmitted to the API substantially immediately after the identification. When the data has been input into a user's computing device, a first application running on the user's computer may access the input data and transmit it to the API. In some embodiments, a plurality of user computing devices may each run the first application. When the data has been identified electronically by a second application, the second application may transmit the data to the API. In some embodiments, a plurality of user computing devices may each run the second application.

The first and second application may be referred to alternately herein as "the applications." The first applications may be browser plug-ins. The second applications may be browser plug-ins. In some embodiments, a single application may perform the functions of the first and second applications described herein.

The API may store the data received from the applications. Upon the lapse of a time period, the API may process all data received during the time period that identifies the suspect websites. The API may process the received data as a batch job. In some of these embodiments, the suspect website data received by the API during the time period may comprise the first dataset.

A time period may be one, two, three, four or five hours, twice a day, daily, and/or any other suitable time period.

In some embodiments, data identifying suspect websites may be stored by each of the applications during a time period. Each of the applications may subsequently transmitted to the API the stored data upon the lapse of the time period. When the data has been input manually into a user's computing device, the first application running on the user's computer may store all input data during the time period and transmit the data to the API upon the lapse of the time period. When the data has been identified by the second application, the second application may store all data relating to suspect websites during the time period and subsequently transmit the data to the API upon the lapse of the time period.

In some embodiments, when a suspect website has been identified, the applications may transmit data identifying the suspect website to a database. The database may be owned and/or operated by a first provider. The data may be transmitted substantially immediately after the identification. The database may store the data. The database may re-format and/or process the data to conform with one or more predetermined specifications. Some or all of the data transmitted to the database from the applications may comprise the first dataset.

The database may transmit the first dataset to the API. The first dataset may include data transmitted from the first applications and, in some embodiments, the second applications, during a time period. The first dataset may also include suspect websites identified by one or more applications run by the first provider. The database may transmit the first dataset to the API as a batch. The database may transmit the first dataset to the API upon the lapse of the time period.

Upon receipt of the first dataset, the API may augment the first dataset with additional data. The augmenting may include adding additional suspect websites to the first dataset. The additional web sites may be identified by a second provider. The second provider may be different from the first provider.

The method may include receiving a second dataset. The second dataset may be received by the API. The second dataset may include a second plurality of websites. The second plurality of web sites may be white-listed websites. The white-listed websites may be sponsored by an entity. The second dataset may be compiled and transmitted to the API by an application owned by the entity.

The method may include executing a first set of instructions.

In some embodiments, the first set of instructions may include accessing each of the plurality of websites included in the first dataset. The first set of instructions may include assigning a confidence score to each of the websites included in the first dataset.

Assigning the confidence score may be based at least in part on identifying a website's spelling mistakes, grammar mistakes, and any other suspicious data. The confidence score may represent a computed probability of the website including malware.

In some embodiments, the first set of instructions may include modifying the first dataset. The first dataset may be modified by removing all websites from the first dataset that are included in the second plurality of websites. The first dataset may be modified to create a modified first dataset. The first set of instructions may include accessing each of the plurality of websites included in the modified first dataset. The first set of instructions may include assigning a confidence score to each of the websites included in the modified first dataset.

The method may include executing a second set of instructions. The second set of instructions may include creating a third dataset. The third dataset may include a third list of websites. The third list of websites may have a URL including a predetermined term. The second set of instructions may include removing from the third dataset the second plurality of web sites to create a modified third dataset.

The method may include extracting from the modified first dataset all web sites having an assigned confidence score greater than a predetermined value.

The predetermined value may be user-selected. The predetermined value may be modified by a user. The method may include modifying the predetermined value in response to the receipt of a user instruction to modify the predetermined value.

The method may include combining the extracted data from the modified first dataset and the modified third dataset to create a fourth dataset including a fourth list of web sites.

The method may include initiating a take-down procedure for the fourth list of web sites. Initiating the take-down procedure may include sending a take-down request to one or more central severs. Each central server may be a central server that hosts one or more of the websites included in the fourth list of websites.

The method may include transmitting a blocking instruction. In some embodiments, the blocking instruction may instruct a user's browser to block each of the websites included in the fourth list of websites. Blocking the fourth list of websites may deny the user access to the web sites included in the fourth list. In some embodiments, the blocking of instruction may instruct a user's browser to warn the user prior to accessing each website included in the fourth list of websites.

The blocking instruction may be transmitted to the first and second applications, a plurality of browser plug-ins, and/or a central server. In the embodiments where the blocking instruction is set to a central server, the central server may transmit the blocking instruction to the first and second applications and/or a plurality of browser plug-ins.

In the embodiments where the blocking instruction is transmitted to the central server, the browser-based blocking may include updating a list of websites stored in a central server. The list of websites may be a black-listed list of websites.

The list of websites may be accessed by a plurality of browser plug-ins, each browser plug-in residing on a user's internet browser. The browser plug-ins may access the list of websites. The browser plug-ins may warn a user prior to accessing a website included in the list of websites. The browser plug-in may block a user's access to each website included in the list of websites.

The method may be performed by a system.

The system may include the browser plug-in. The system may include the API. The system may include the remote server. The system may include the central server. The system may include the database.

The system may include the browser plug-in. The browser plug-in may include the first application. Functions described herein as being performed by the browser plug-in may be performed by the first applications and/or the second applications. Functions described herein as being performed by the first and second applications may be performed by the browser plug-in.

The browser plug-in may run on a user's computing device. The browser plug-in may receive information from the computing device. The information may include a URL accessed by the user.

The browser plug-in may review the URL. The browser plug-in may review the URL by accessing a website associated with the URL. The browser plug-in may review contents of the website associated with the URL.

In some embodiments, the browser plug-in may transmit to the API the URL of a website that, based on the review, has been identified as potentially including malicious software. In some embodiments, the browser plug-in may transmit to the database the URL of the website that, based on the review, has been identified as potentially including malicious software. The transmission of data from the browser plug-in to either the API or the database may be performed substantially immediately or upon the lapse of a time period, as detailed above.

In some embodiments, the system may include a single browser plug-in. In some embodiments, the system may include a plurality of browser plug-ins. Each of the plurality of browser plug-ins may execute functions described herein in connection with the browser plug-in.

The API may receive data from the browser plug-in. The data may include the URL. The API may access the URL and, based on the accessing, assign to the URL a confidence score. The confidence score may be based at least in part on data displayed on the webpage associated with the URL, as detailed above.

The API may determine whether or not the URL has an assigned confidence score greater than or equal to a predetermined value. After determining that the URL has an assigned confidence score greater than or equal to the predetermined value, the API may transmit a take-down request to the remote server. The take-down request may include the URL. The API may additionally, or alternatively, transmit a blocking instruction to the central server. The blocking instruction may include the URL.

The system may include the remote server. The remote server may host the URL. The remote server may receive the blocking instruction from the API. The remote server may initiate a take-down procedure for the URL.

The system may include the central server. The central server may receive the blocking instruction. The central server may transmit the URL to the browser plug-in. The browser plug-in may monitor the user's browser activity.

In some embodiments, the browser plug-in may block a user's access to the URL after receipt of the blocking instruction from the central server. In some embodiments, the browser plug-in may restrict a user's access to the URL after receipt of the blocking instruction from the central server. In some embodiments, the browser plug-in may warn a user who attempts to access the URL. The browser plug-in may allow the user to access the URL if the user selects to ignore the warning.

The browser plug-in may display an icon in a display box included in the user's browser. The icon may visually indicate to the user safety parameters associated with a website accessed by the user. For example, if the user is accessing a website that has been 'whitelisted,' the icon may display a green color and/or a check within display box. If the user accesses a website that has been determined to potentially include malware, the icon may display a red color and/or an 'x' within the display box.

The system described above has been described as including a browser plug-in and a URL. In some embodiments, the browser plug-in may identify and transmit a plurality of URLs to the API. In some embodiments, the system may include a plurality of browser plug-ins, each browser plug-in transmitting a plurality of URLs to the API. Additionally, the API may receive data from other sources, such as the second application described above. Furthermore, the API may generate and/or receive additional suspicious URL data from one or more data sources different from the browser plug-ins. The API may, in some embodiments, receive the second dataset including whitelisted URLs, and remove from the received data all whitelisted URLs.

For example, in exemplary embodiments, the browser plug-in may be one of a plurality of browser plug-ins. The computing device may be one of a plurality of computing devices. The user may be one of a plurality of users. Each of the browser plug-ins may receive information from one of the plurality of computing devices. The information may include URLs accessed by one of the plurality of users. Each of the browser plug-ins may review the URLs for malicious software. Each of the browser plug-ins may transmit to the API one or more of the URLs. The transmitted URLs may have been identified, based on the review, as including malicious software.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of the methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method or another method described herein.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

Figure 1:
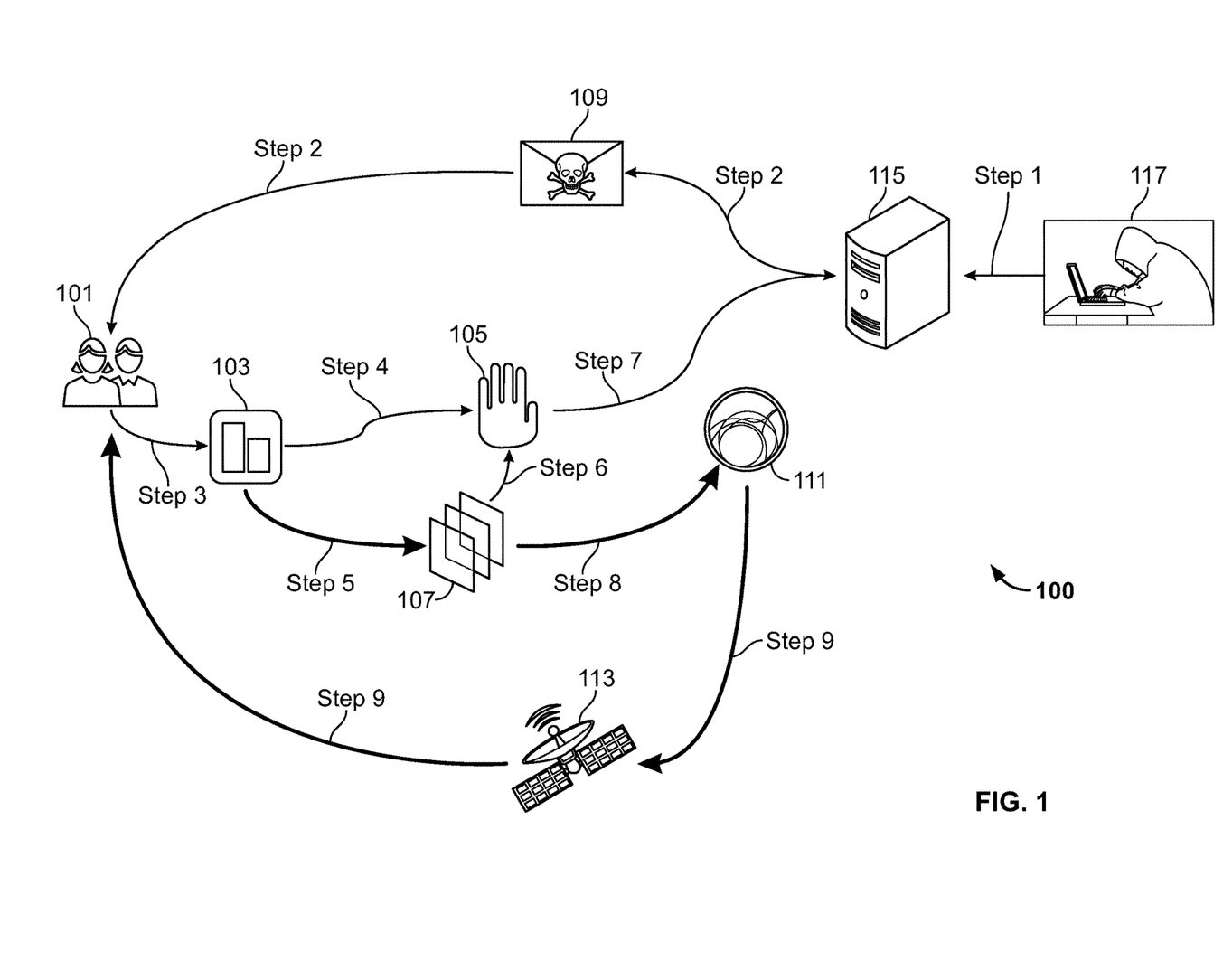
FIG. 1 shows an illustrative method in accordance with principles of the invention.

FIG. 1 shows illustrative method 100 in accordance with the invention. Method 100 may include one, two or more of steps 1-9. Method 100 may include one, two or more steps not shown in FIG. 1 but described herein.

At step 1, malware 109 may be transmitted from hacker 117 to remote server 115. At step 2, malware 109 may be transmitted from remote server 115 to browser plug-in 101. Malware 109 may be transmitted from remote server 115 to browser plug-in 101 when a user of browser plug-in 101 accesses a website including malware 109.

At step 3, the website including the malware may be determined to be a potentially dangerous website by an application running on the user's computing device. The application may be browser plug-in 101. In other embodiments, the application may be the second application.

Browser plug-in 101 may transmit the URL of the website and any other data relating to the malware to database 103. In other embodiments, the website may be sent from browser plug-in 101 directly to API 107.

The transmitted data may include one or more of the website's URL, a confidence score, website data used by the application to determine that the website is potentially dangers, and any other suitable data.

Database 103 may receive data from browser plug-in 101. Database 103 may receive data from a plurality of browser plug-in applications (not shown). The data may include URLs of websites identified by the browser plug-in application(s) as suspicious websites. Database 103 may receive data from other applications that scan the web for potentially malicious software. Database 103 may receive white-listed websites. The white-listed websites may be entity-sponsored.

Database 103 may re-format some of the received data to conform with predetermined specifications.

In some embodiments, at step 4, database 103 may forward the transmitted data to website take-down service 105. Website take-down service may initiate a take-down procedure for websites included in the transmitted data. In some embodiments, the transmitted data may include websites assigned a high confidence score by browser plug-in 101. The high confidence score may indicate a high certainty that the website contains malware.

At step 5, database 103 may transmit received data to API 107. Database 103 may push received data to API 107 upon the lapse of a time period. Database 103 may push the received data as a batch job to API 107. Database 103 may transmit to API 107 the first dataset. Database may 103 may transmit to the API the second dataset.

API 107 may process the received data. API 107 may modify the first dataset to remove the whitelisted websites included in the second dataset. API 107 may process the received data to assign a confidence score to the potentially malicious websites included in the modified first dataset. API 107 may review the websites and, based on the review, assign a confidence score to each website.

At step 6, API 107 may transmit data identifying potentially malicious websites to remote server 105. The data transmitted by API 107 to remote server 105 may include all websites in the modified first dataset which have been assigned a confidence score greater than a predetermined value. The data transmitted by API 107 to website take-down service 105 may include all websites assigned a confidence score equal to, or greater than, a predetermined value.

At step 7, website take-down service 105 may initiate a process for taking down the websites identified by API 107. The initiated process may include sending a take-down request to remote server 115 to take down the website supporting malware 109.

At step 8, API 107 may transmit the websites having a confidence score of a predetermined value (or greater than or equal to the predetermined value) to central server 111.

At step 9, central sever 111 may transmit the websites to browser plug-in 10. Additionally, or alternatively, browser plug-in 10 may periodically pull data from central server 111 (step not shown). Browser plug-in 101 may block a user's access to all URLs received from central server 111. Thus, user 101 may be protected from exposure from malware 109 until website take-down service 105 concludes the take-down process.

Figure 2:
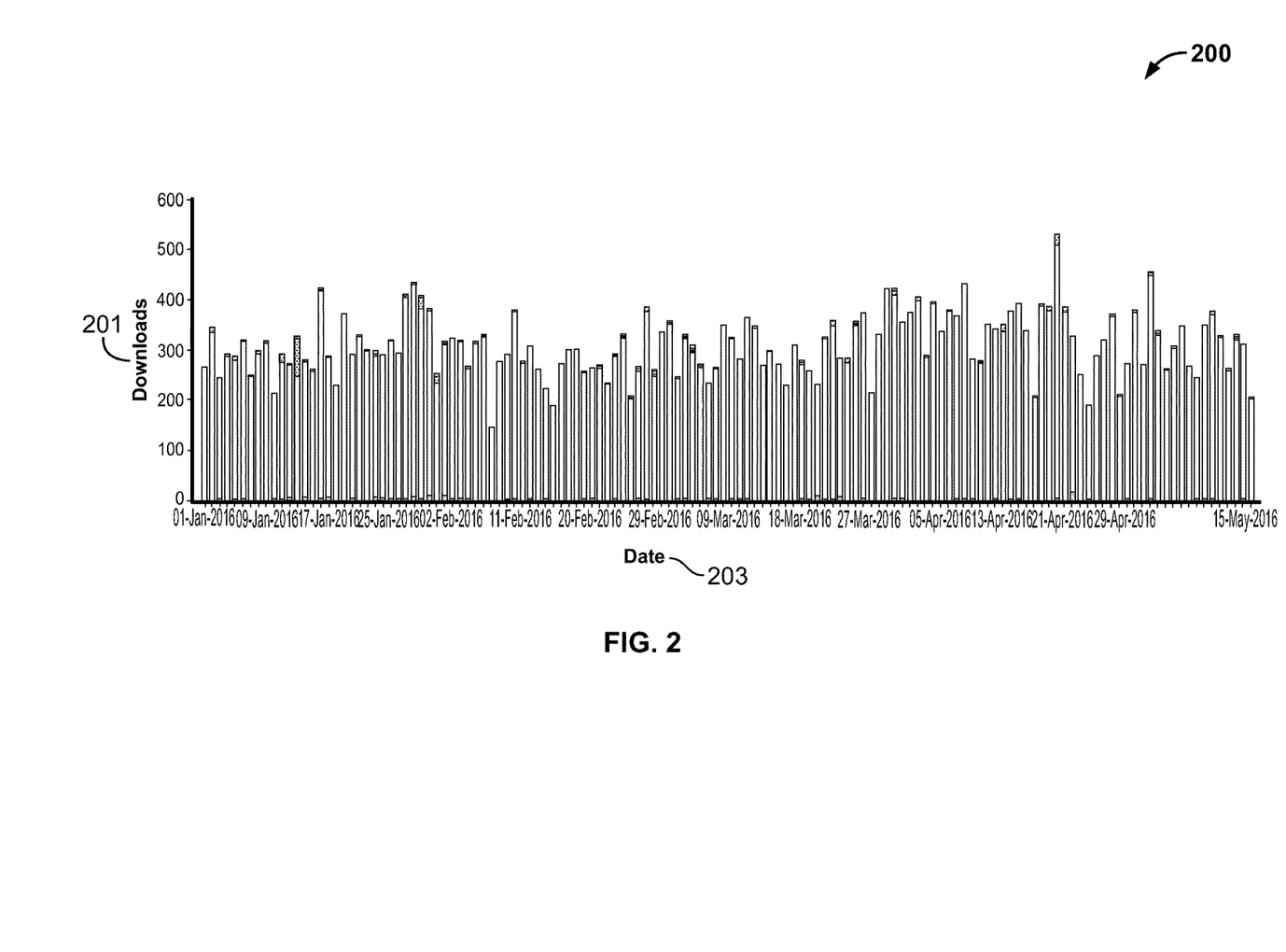
FIG. 2 shows an illustrative report.

FIG. 2 shows illustrative report 200. Illustrative report 200 shows a number of downloads 200 that were downloaded per day on dates 203, ranging from Jan. 1, 2016, to May 15, 2016. Downloads 200 represent a number of websites identified as potentially malicious websites on each of dates 203.

Figure 3:
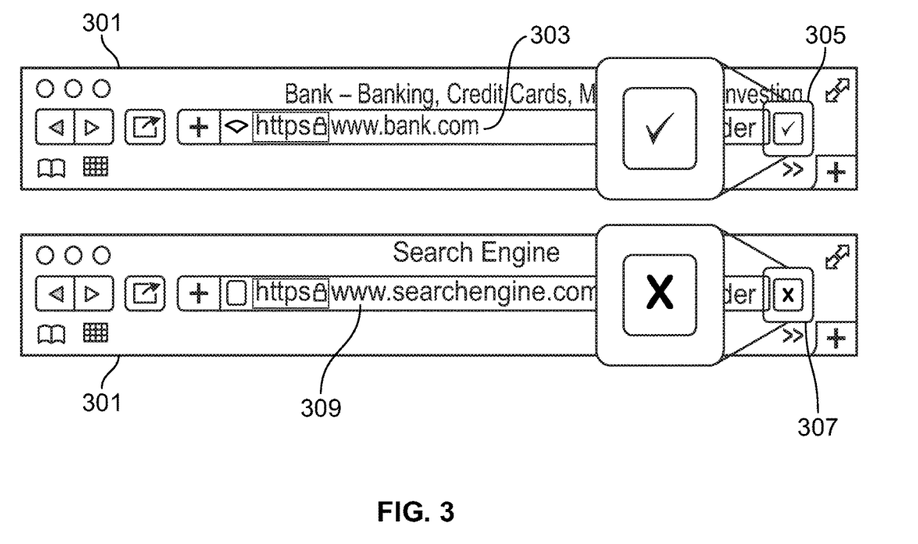
FIG. 3 shows illustrative portions of a graphical user interface ("GUI") in accordance with principles of the invention.

FIG. 3 shows illustrative portion 301 of an exemplary GUI that may be displayed on a user's internet browser. GUI 301 may include display box 305. A browser plug-in, or a first or second application as described herein, may review the content of webpage 303 accessed by the user's internet browser. Display box 305 may generate an icon based on the results of the review.

Display box 305 may display a first icon in the display box when the review determines that website 303 is safe. Display box 305 may display a second icon when the review determines that website 303 is not safe.

In illustrative portion 301, an application in accordance with the invention has determined that website 303 is safe, and has instructed display box 305 to display a check symbol. At a different point in time, the application has determined that website 309 not is safe, and has instructed display box 307 to display a check symbol.

Figure 4:
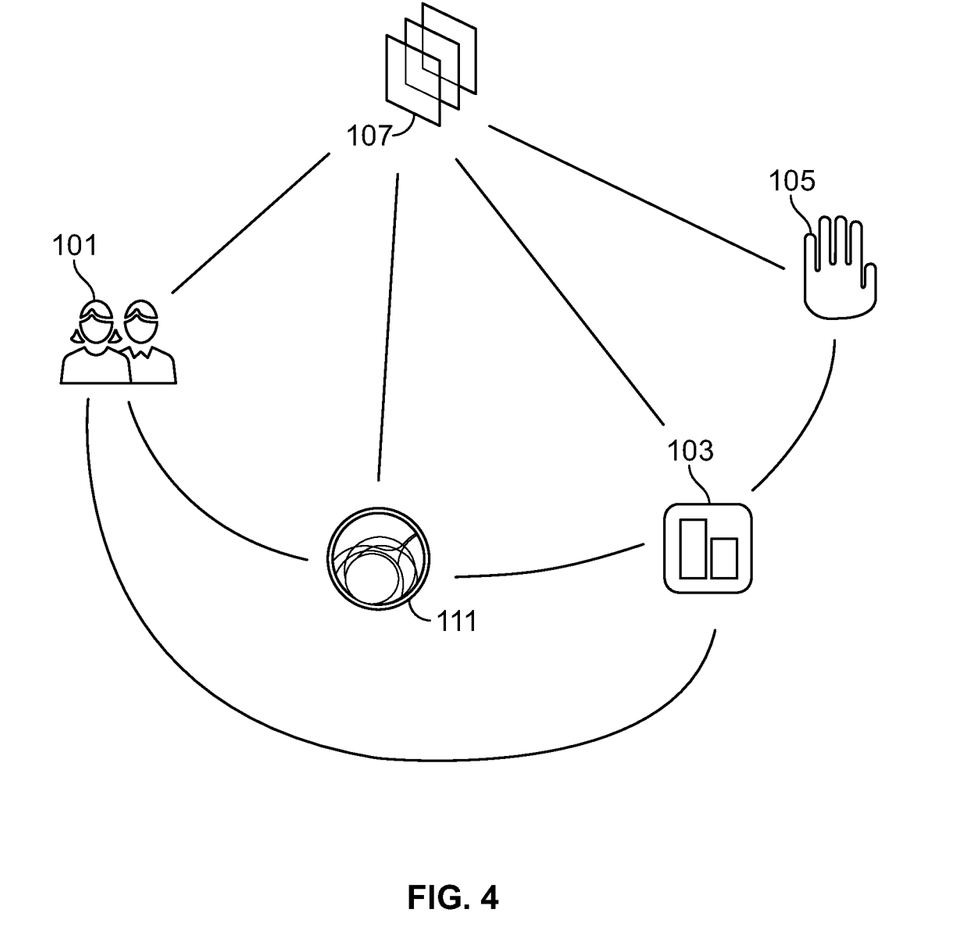
FIG. 4 shows illustrative system architecture in accordance with principles of the invention.

FIG. 4 shows illustrative system architecture in accordance with the invention. The system architecture may include browser plug-in 101. The system architecture may include API 107. The system architecture may include database 103. The system architecture may include central server 111. The system architecture may include take-down service 105.

Browser plug-in 101 may be in electronic communication with one or more of API 107, central server 111, and database 103. In some embodiments, browser plug-in 101 may be in electronic communication with take-down service 105 (not shown).

Central server 111 may be in electronic communication with one or more of API 107, browser plug-in 101 and database 103.

Database 103 may be in electronic communication with one or more of take-down service 105, browser plug-in 101, central server 111 and API 107.

Take-down service 105 may be in electronic communication with one or both of database 103 and API 107. In some embodiments, take-down service 105 may be in electronic communication with browser plug-in 101 (not shown).

API 107 may be in electronic communication of one or more of browser plug-in 101, central server 111, database 103 and take-down service 105.

The system shown in FIG. 4 may be used to perform the methods described herein.

Thus, methods and apparatus for providing enhanced computer security have been provided. Persons skilled in the art will appreciate that the present invention can be practiced by other than the described embodiments, which are presented for purposes of illustration rather than of limitation. The present invention is limited only by the claims that follow.

What is claimed is:

1. A method for enhancing computer security, the method comprising:
   receiving a first dataset including a first plurality of websites that have been identified as potentially including malicious software by an application running on a user's computer device and a second dataset including a second plurality of websites, the second plurality of websites comprising whitelisted websites;
   executing a first set of instructions, the first set of instructions including:
      accessing each of the first plurality of websites and, based on the accessing, assigning a confidence score to each of the websites;
   executing a second set of instructions, the second set of instructions including:
      creating a third dataset including a third list of websites having a URL that includes a predetermined term; and
      removing from the third dataset the second plurality of websites to create a modified third dataset;
   extracting from the first dataset all websites having an assigned confidence score greater than a predetermined value;
   combining the extracted data from the first dataset and the modified third dataset to create a fourth dataset including a fourth list of potentially malicious websites;
   initiating a take-down procedure for the fourth list of potentially malicious websites by sending a take-down request to one or more remote servers to take down the fourth list of potentially malicious websites, each of the one or more remote servers hosting one or more websites included in the fourth dataset; and
   sending a blocking instruction to a central server, the blocking instruction initiating a browser-based blocking of the fourth list of websites.

2. The method of claim 1 wherein the assigning the confidence score is based at least in part on identifying a website's spelling and grammar mistakes.

3. The method of claim 1 wherein the white-listed websites are entity sponsored.

4. The method of claim 1 further comprising modifying the predetermined value in response to the receipt of a user instruction to modify the predetermined value.

5. The method of claim 1 wherein the predetermined value is user-selected.

6. The method of claim 1 wherein the browser-based blocking includes updating a list of websites stored in a central server.

7. The method of claim 6 of wherein the list of websites is a black-listed list of websites.

8. The method of claim 6 wherein the list of websites is accessed by a plurality of browser plug-ins, each browser plug-in residing on a user's internet browser, wherein each browser plug-in accesses the list of websites and blocks user access to each website included in the list of websites.

9. The method of claim 6 wherein the list of websites is accessed by a plurality of browser plug-ins, each browser plug-in residing on a user's internet browser, wherein each browser plug-in accesses the list of websites and generates a warning message prior to allowing access to each website included in the list of websites.

10. A method for enhancing computer security, the method comprising:
   receiving a first dataset including a first plurality of websites that have been identified as potentially including malicious software by an application running on a user's computer device and a second dataset including a second plurality of websites, the second plurality of websites comprising whitelisted websites;
   executing a first set of instructions, the first set of instructions including:
      modifying the first dataset by removing all websites from the first dataset that are included in the second plurality of websites; and
      accessing each of the plurality of websites included in the modified first dataset and, based on the accessing, assigning a confidence score to each of the websites;
   executing a second set of instructions, the second set of instructions including:
      creating a third dataset including a third list of websites having a URL, that includes a predetermined term; and
      removing from the third dataset the second plurality of websites to create a modified third dataset;
   extracting from the modified first dataset all websites having an assigned confidence score greater than a predetermined value;
   combining the extracted data from the modified first dataset and the modified third dataset to create a fourth dataset including a fourth list of potentially malicious websites;
   initiating a take-down procedure for the fourth list of potentially malicious websites sending a take-down request to one or more remote servers to take down the fourth list of potentially malicious websites, each of the one or more remote servers hosting one or more websites included in the fourth dataset; and
   sending a blocking instruction to a central server, the blocking instruction initiating a browser-based blocking of the fourth list of websites.

11. The method of claim 10 wherein the assigning the confidence score is based at least in part on identifying a website's spelling and grammar mistakes.

12. The method of claim 10 wherein the white-listed websites are entity sponsored.

13. The method of claim 10 further comprising modifying the predetermined value in response to the receipt of a user instruction to modify the predetermined value.

14. The method of claim 10 wherein the predetermined value is user-selected.

15. The method of claim 10 wherein the browser-based blocking includes updating a list of websites stored in a central server.

16. The method of claim 15 of wherein the list of websites is a black-listed list of websites.

17. The method of claim 15 wherein the list of websites is accessed by a plurality of browser plug-ins, each browser plug-in residing on a user's internet browser, wherein each browser plug-in accesses the list of websites and blocks user access to each website included in the list of websites.

18. The method of claim 15 wherein the list of websites is accessed by a plurality of browser plug-ins, each browser plug-in residing on a user's internet browser, wherein each browser plug-in accesses the list of websites and generates a warning message prior to allowing access to each website included in the list of websites.

* * * * *